(12) United States Patent
Steiff et al.

(10) Patent No.: US 6,763,557 B2
(45) Date of Patent: Jul. 20, 2004

(54) BUCKLE WITH A BUCKLE RELEASE SYSTEM

(75) Inventors: Byron K. Steiff, Bradenton, FL (US); Robert Clark, Seminole, FL (US)

(73) Assignee: Conax Florida Corporation, St. Petersburg, FL (US)

( * ) Notice: Subject to any disclaimer, the term of this patent is extended or adjusted under 35 U.S.C. 154(b) by 0 days.

(21) Appl. No.: 10/609,536

(22) Filed: Jul. 1, 2003

(65) Prior Publication Data

US 2004/0000038 A1 Jan. 1, 2004

Related U.S. Application Data

(60) Provisional application No. 60/393,202, filed on Jul. 1, 2002.

(51) Int. Cl.[7] .......................... B64D 17/32; A44B 11/26
(52) U.S. Cl. ........................................ 24/639; 24/603
(58) Field of Search ................... 24/602, 603, DIG. 36, 24/579.11, 651–654, 637, 639; 244/151 A, 151 B

(56) References Cited

U.S. PATENT DOCUMENTS

| | | | | |
|---|---|---|---|---|
| 2,105,480 A | | 1/1938 | Hoffman | |
| 3,183,568 A | | 5/1965 | Gaylord | |
| 3,230,594 A | * | 1/1966 | Smith | 24/653 |
| 3,523,340 A | * | 8/1970 | Stoffel | 24/639 |
| 3,541,650 A | | 11/1970 | Gaylord | |
| 3,541,651 A | | 11/1970 | Gaylord | |
| 3,593,388 A | * | 7/1971 | Coyle | 24/653 |
| 3,744,102 A | | 7/1973 | Gaylord | |
| 3,744,103 A | | 7/1973 | Gaylord | |
| 3,768,611 A | | 10/1973 | Gaylord | |
| 3,964,138 A | | 6/1976 | Gaylord | |
| 4,095,313 A | | 6/1978 | Piljay et al. | |
| 4,185,363 A | | 1/1980 | David | |
| 4,203,181 A | | 5/1980 | Gaylord et al. | |
| 4,365,776 A | | 12/1982 | Gaylord et al. | |
| 5,097,572 A | | 3/1992 | Warrick | |
| 5,857,247 A | | 1/1999 | Warrick et al. | |
| 6,070,921 A | | 6/2000 | Valasin | |
| 6,126,372 A | | 10/2000 | Takata | |
| 6,267,420 B1 | | 7/2001 | Miyagawa | |

* cited by examiner

Primary Examiner—James R. Brittain
(74) Attorney, Agent, or Firm—Banner & Witcoff, Ltd.

(57) ABSTRACT

A buckle including a buckle release system for releasing a parachute canopy from a harness. The buckle comprises a lock lever, a manual release lever, a spring biased catch, and a latch positioned in a frame. A slide member is provided. The slide member operates to hold the latch in the locked position, and prevents a buckling member from being released from the buckle when the buckle is in a locked position. In the open position, a spring moves the slide and the buckling member out of the frame, thereby releasing the buckling member from the buckle.

20 Claims, 9 Drawing Sheets

BUCKLE WITH A BUCKLE RELEASE SYSTEM

RELATED APPLICATION

Benefit of the Jul. 1, 2002 filing date of Provisional Application Serial No. 60/393,202 is hereby claimed. The full disclosure of the application is incorporated herein by reference.

FIELD OF INVENTION

The present invention relates to a buckle, more particularly, the present invention relates to a buckle with a buckle release system that can be used with a parachute harness.

BACKGROUND OF THE INVENTION

A harness for use with a parachute may include a buckle having a buckle release system for releasing the harness from the canopy of the parachute. A conventional buckle, such as that disclosed in U.S. Pat. No. 5,857,247 to Warrick et al., has a buckle release system for the manual or automatic release of a crewmember harness from its associate harness. This conventional buckle has a frame that receives a cooperating buckling member (tang) that is secured to a portion of the harness. A tang assembly secures the buckling member in the frame. A latch that pivots between a closed position and an open position holds the tang assembly. The latch is intended to prevent the inadvertent release of the buckling member from the frame. A lever that includes a cavity holds a free end of the latch. During operation, the lever is moved to an open position in order to release the latch. However, like other conventional buckles, the buckle disclosed in the patent to Warrick et al. may not open and release the harness under some difficult and extreme conditions. Failure of the buckle to open and release can be hazardous to the wearer of the harness. For example, the canopy may exert a substantial force on the harness when the conditions are windy. If the buckle fails to release or the wearer is unable to operate the buckle, the aircraft personnel could be dragged along the ground or through water due to the force of the wind on the canopy. This could place the wearer in great danger of receiving significant bodily injury.

Accordingly, a need exists for a buckle with a buckle release system that can withstand and operate under difficult operating environments.

SUMMARY OF THE INVENTION

An aspect of the present invention includes a buckle with a buckle release system for releasing a parachute harness from about a wearer. The buckle release system can include a manual release mechanism and/or an automatic release mechanism. In one embodiment, the buckle release system comprises a lock lever, a manual release lever, a latch, and a spring-biased catch. The lock lever can hold the manual release lever in the locked position and provide a guard to prevent inadvertent/accidental release of the buckle. When the lock lever is removed from engagement with the manual release lever, the manual release lever is operable and capable of moving relative to the frame of the buckle. The manual release lever is capable of engaging with and rotating a shaft having a catch disposed thereon. The catch is engageable by the manual release lever but can be independent of the manual release lever such that when the catch is rotated through operation of an automatic release mechanism, the manual release lever does not rotate with the shaft and catch.

In an embodiment, the catch has a pivoting end, a free end, and defines a latch recess with a latch holding ledge disposed thereon. In this embodiment, the latch holding ledge is capable of engaging with the free end of a latch that is pivotally attached to the frame. The catch can be biased in the locked position, for example, by a spring. The latch can comprise a tooth capable of rotating into and out of engagement with a slide. The slide moves in reciprocal fashion in the frame between locked and open positions, and has a first end and a second end opposite the first end. In an embodiment, the slide can comprise a tooth contacting shoulder that cooperates with the tooth on the latch to hold the slide in the locked position. In this embodiment, the slide comprises a slide contacting shoulder that may be at about a 45° angle and shaped to engage with a buckle lip on a buckling member that is attached to the harness. The frame comprises a narrow portion that defines a "necked down" opening that enables the buckling member to disengage from the slide in an open, position, and provides an obstruction to keep the buckling member engaged with the slide when the slide is in the locked position.

The buckle according to an aspect of the present invention includes a buckle release system that can be operated by aircraft personnel under difficult and potentially life threatening conditions. Additionally, the buckle can be resistant to sand for situations where the parachutist lands on a beach or other sandy environment. As a result, the buckle according to an aspect of the present invention can operate under conditions that would otherwise pose a dangerous situation to the wearer.

BRIEF DESCRIPTION OF THE DRAWINGS

The invention is illustrated in the drawings in which like reference characters designate the same or similar parts throughout the figures of which.

DETAILED DESCRIPTION

Figure 1:
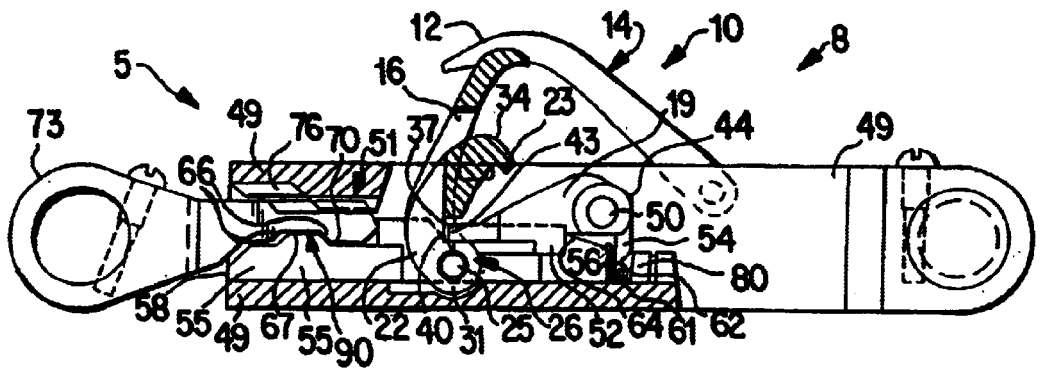
FIG. 1 is a side view partly in cross-section showing the buckle system in a closed configuration.
Figure 2:
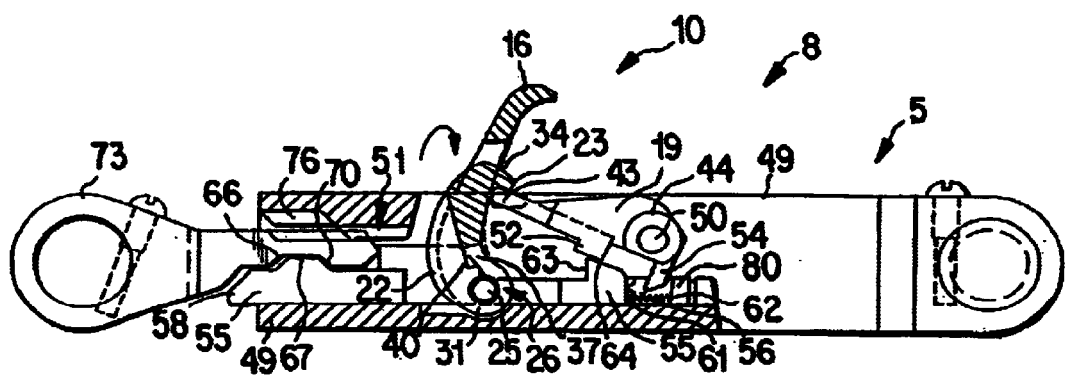
FIG. 2 is a view analogous to FIG. 1 except that the buckle system is being opened and a lock lever has been removed for ease of understanding.
Figure 3:
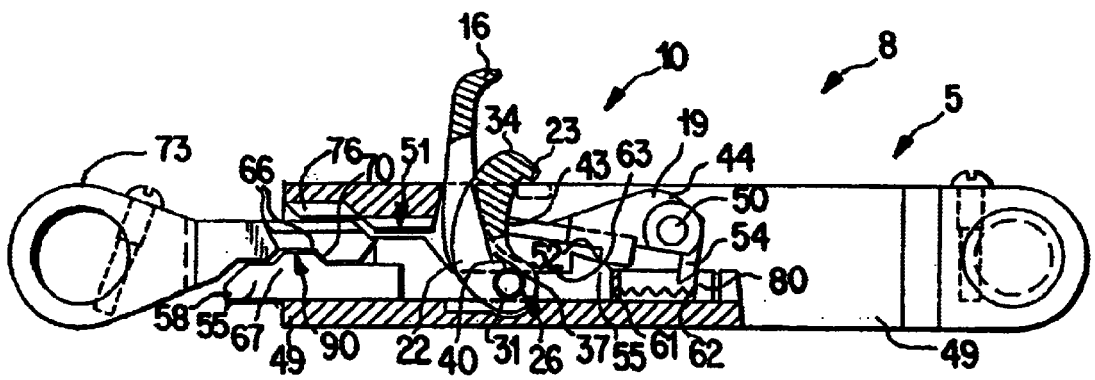
FIG. 3 is a view analogous to FIG. 2 except the buckle system has been opened and is in the process of being closed again.

FIGS. 1–3 illustrate an embodiment of a buckle system 5 including a buckle 8 according to an aspect of the present invention. The buckle 8 comprises a buckle release system 10 that allows for the opening and closing of the buckle 8. In FIG. 1, the buckle 8 and the buckle release system 10 are in a closed or locked position. It is noted that in the closed position shown in FIG. 1, a cooperating buckling member 73, which comprises a buckle lip 70, is locked within the buckle 10.

As illustrated, the buckle 8 comprises a frame 49 that supports the buckle release system 10. At a first end, the buckle 8 can be secured to a known harness. The harness can be a man-mounted torso harness of a parachute or a cockpit seat. In an embodiment, the buckle 8 and the cooperating buckling member 73 can both be secured to the webbing of the harness in a known manner. In an embodiment, the buckle release system 10 can be permanently mounted into the cockpit of an aircraft (not shown).

The buckle lip 70, shown in FIGS. 1–3, can comprise at least one angled surface having an angle of about 45° relative to a planar member with which it forms a contacting shoulder 66. The buckle lip 70 contacts a slide contacting shoulder 67 of a slide 55 positioned within the buckle frame 49. As a result, when the slide 55 is securely retained within the frame 49, the buckle lip 70 will be secured within the frame 49. The slide 55 can include multiple angled surfaces having an angle of about a 45° relative to the planar member with which it forms the shoulder 66 that cooperates with the shoulder 67 while the slide 55 is held in the frame 49 by the buckle release mechanism 10. The 45° angle of the buckle lip 70 causes the cooperating buckle member 73 to wedge between the slide 55 and the frame 49 at a wedge 90. This wedging creates a friction fit proportional to the pulling force exerted on the buckling member 73. This friction force in turn causes the buckling member 73 to lock into the buckle 8. The wedge 90 also limits the force exerted on a latch 19 within the buckle 8 as discussed below. As a result, when the buckle release system 10 is released, the slide 55 moves to the left, as viewed in FIG. 2, and in a manner to be described, in order to release the buckling member 73 from within the frame 49.

In an embodiment, the buckle includes a lock lever 12 that is pivotally mounted to the frame 49. The lock lever 12 prevents the accidental release of the manual release lever 16. The lock lever 12 keeps the manual release lever 16 in the locked position to prevent the release of the buckle release system 10. The lock lever 12 is movable between a first, locked position 14 (FIG. 1) and second, unlocked position (not shown). In the first position, the lock lever 12 engages and locks the manual release lever 16 in place. In the second position, the lock lever 12 is moved clockwise to a location where it is free of engagement with the manual release lever 16. When the lock lever 12 is out of the way, the manual release lever 16 may be manually operated.

The buckle release mechanism 10 further comprises a catch 22. In an illustrated embodiment, the catch 22 is biased by a spring 26 and a latch 19. The manual release lever 16 is capable of engaging with the catch 22 disposed thereon. The catch 22 is engageable by the manual release lever 16 but is independent from the manual release lever 16, such that when the shaft or pivot 25 is rotated through operation of an automatic release mechanism 100 (FIG. 4), the manual release lever 16 does not rotate with the catch 22. This situation allows for the automatic operation to buckling member 73 with the lock lever 16 in either the closed position or locked position.

As shown in FIGS. 1–3, the catch 22 can comprise a pivoting end 31 connected to the pivot 25, and a free end 34. The catch 22 defines a latch recess 37 located adjacent to a latch holding ledge 40. In the closed position (FIG. 1), the free end 43 of the latch 19 is located in the latch recess 37 defined in the catch 22. The latch holding ledge 40 is capable of engaging with the free end 43 of the latch 19. The catch 22 is spring biased clockwise by the spring 26 with respect to the orientation of the pivot 25 shown in FIG. 1.

The pivot end 44 of the latch 19 is attached to the latch pivot 50, and the frame 49 rotatably supports the latch pivot 50. Accordingly, the catch 22 is spring-biased in the locked or closed position when it is configured as shown in FIG. 1.

The latch 19 comprises a tooth 52 capable of rotating into and out of engagement with a slide 55. The tooth 52 is located between the free end 43 of the latch 19 and the latch shaft or latch pivot 50. The latch 19 also comprises a projection 54 that extends from the pivot end 44 of the latch 19. The projection 54 is on the side of the latch pivot 50 opposite the tooth 52, as shown in FIGS. 1–3.

One of the functions of the projection 54 is to prevent the slide 55 from moving too far to the right, as will be described presently. A slide spring 62 provides the force required to move the buckling member 73 out of the buckle 8 and the buckle release system 10.

In addition to being held in the frame 49, the slide 55 may also be reciprocated within the frame 49 back and forth as indicated by the arrows designated A—A in FIG. 2. This reciprocation of the slide 55 is between the locked position (FIG. 1) and the open position (FIG. 2). The slide 55 comprises a first end 58 and a second end 61 opposite the first end 58. The above-described projection contact 56 is attached to the second end 61. The slide 55 further comprises a tooth contacting shoulder 64 near the second end 61, the tooth contacting shoulder 64 cooperates with the tooth 52 on the latch 19 to hold the slide 55 in the locked position. The slide 55 further comprises a slide wall 63, and a slide contacting shoulder 67 near the first end 58 of the slide 55. The slide contacting shoulder 67 is shaped to engage with the buckle lip 70 on the cooperating buckling member 73.

The frame 49 comprises a narrow portion 51 and defines a "necked down" opening 76. The narrow portion 51 extends into the necked down opening 76 as shown in FIG. 2. The narrow portion 51 of the frame 49 enables the buckling member 73 to disengage from the slide 55 in an open position (FIG. 2) and provides an obstruction to hold the buckling member 73 engaged with the slide 55 when the slide 55 is in the locked position (FIG. 1).

As seen in FIG. 3, the slide spring 62 is positioned between the second end 61 of the slide 55 and an internal wall 80. The slide spring 62 is for forcing the slide 55 to the left, when viewed from FIG. 2, when the latch 19 is released from the catch 22. The slide spring 62 forces the slide 55 out of the opening 76 in the frame 49, thus moving the buckling member 73 out of the frame 49 through the frame opening 76 in the process.

Operation of the Buckle Release Mechanism

In operation, the buckle release mechanism 10 is in the closed position when it is in the configuration shown in FIG. 1. In the closed position, the catch 22 is spring biased in the clockwise direction, as shown in the figures, by the spring 26. The slide spring 62 is biased between the second end 61 of the slide 55 and the internal wall 80. Also, the buckling member 73 is held in the buckle release system 10 as discussed above. This can be accomplished by, for example, the shoulder 66 of the buckling member 73 contacting the slide contacting shoulder 67 of the slide 55 forming the wedge 90, and because the tooth 52 of the latch 19 blocks the movement of the slide 55 to the left when viewed from FIG. 1. The latch 19 only supports a portion of the load exerted on the buckling member 73 because of the wedge 90, which, along with the projection 54 on the latch 19, assists in preventing relative movement between the slide 55 and the frame 49. As a result, the slide 55 cannot move left or right as viewed in FIG. 1. The buckle release system 10 is thus in the locked position, because the buckling member 73 cannot be pulled out of the opening 76 in the frame 49.

Rotating the lock lever 12 clockwise with respect to FIG. 1 unlocks the manual release lever 16. Rotating the manual release lever 16 counterclockwise with respect to the orientation of the figures and against the force of the spring 26, causes the catch 22 to rotate counterclockwise about the pivot 25. As a result, the free end 43 of the latch 19 moves out of the latch recess 37 defined in the catch 22 and away from the latch holding ledge 40. The latch 19 rotates freely in the clockwise direction under the force provided by the slide 55 moving to the left under the force of the slide spring 62 which may comprise one or more torsion springs.

Additionally, during the rotation of the latch 19, the tooth 52 on the latch 19 moves along slide wall 63 on the slide 55. Once the tooth 52 clears the slide wall 63, the slide 55 is freed, and moves to the left, as viewed in FIG. 2, under the force of the slide spring 62. The tooth 52 then slides over the tooth contacting shoulder 64 of the slide 55 (FIG. 2) as the slide 55 continues moving to the left. Also, the projection 54 on the latch 19 rotates clockwise about the latch pivot 50 and it engages with and contacts the back 56 of the slide 55, and to a lesser degree assists slide spring 62 in moving the slide 55 to the left. The latch 19 can continue to rotate clockwise until the free end 43 of the latch 19 contacts the latch stop portion 23 of the catch 22, as shown in FIG. 2.

As shown in FIG. 1, the opening 76 in frame 49 is proximate the necked down portion or narrowing portion 51 that accommodates the slide 55 and buckling member 73 when the buckle 8 is in the locked position. In one embodiment, the buckling member 73 is held in the locked position by, at least, the combination of the narrowing portion 51 of the frame 49 and the slide contacting shoulder 67 of the slide 55 that is locked in place by the latch 19. The slide contacting shoulder 67 of the slide 55 and the buckle lip 70 of the buckling member 73 cannot slide over one another, because they are both located in the narrowing portion 51 of the frame 49. This causes the 45° angle wedge 90 that locks the buckling member 73 with a friction force caused by the upward force exerted against the frame 49 and the downward force exerted by the frame 49, as discussed above.

But, when the manual release lever 16 is rotated counterclockwise, the slide 55 moves to the left (FIG. 2), and the buckling member 73 is allowed to move to the left. The opening 76 in the frame 49 allows the buckling member 73 to move therein as the slide 55 continues to move to the left. At substantially the same time, the buckle lip 70 of the buckling member 73 slides over the slide contacting shoulder 67 of the slide 55. Continued movement of the slide 55 and buckling member 73 to the left results in the buckling member 73 being removed from the frame 49 through the opening 76 in the frame 49. The slide 55 no longer obstructs the removal of the buckling member 73 from the buckle release mechanism 10.

Additionally, an embodiment of the buckle release mechanism 10 allows the buckling member 73 to be readily reinserted into the opening 76 and secured in the buckle 8 by the buckling system 10. As shown in FIG. 3, when the buckling member 73 is inserted into the opening 76 in the end of the frame 49, the contact between the buckling member 73 and the slide 55 causes the latch 19 to rotate counterclockwise about latch pivot 50. Also, the slide spring 62 compresses. In response, the free end 43 of the latch 19 is then rotated counterclockwise. As a result of the motion of the free end 43 of the latch 19, the catch 22 is rotated counterclockwise against the force of its spring until the free end 43 of the latch 19 moves into the latch recess 37 in the catch 22, and the free end 43 of the latch 19 engages latch holding ledge 40.

Accordingly, by pushing the buckling member 73 into the frame 49 of the buckle 8 from left to right with respect to FIG. 3, the latch 19 is automatically rotated counterclockwise back into its starting position shown in FIG. 1, wherein its free end 43 engages with the latch recess 37 defined in the catch 22. The projection 54 rotates to it starting position, contacts the second end 61 of the slide, and prevents the slide 55 from moving to the right as viewed in FIG. 1.

Once the buckle release mechanism 10 is reset as described above, the lock lever 12 is placed into engagement with the manual release lever 16 to prevent inadvertent counterclockwise rotation of the manual release lever 16. The lock lever 12 is held in its closed position (FIG. 1) by springs (not shown) that bias the lock lever 12 in the counterclockwise direction.

Figure 4:
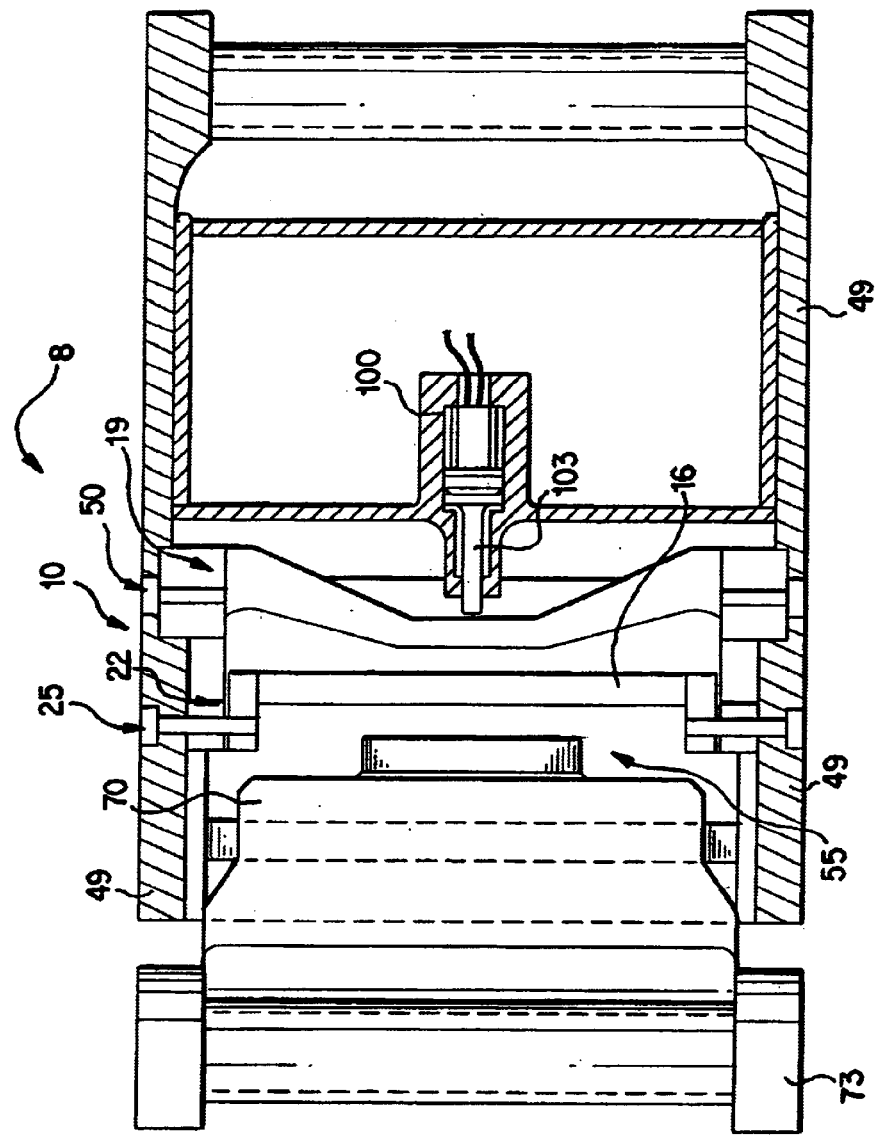
FIG. 4 is a top plan view of the buckle release mechanism.

FIG. 4 is a plan view of the buckle release mechanism 10. Shown in FIG. 4 is an electronic assembly 100 that provides for automatically releasing the buckling member 73. If certain conditions are met, such as the sensing of water in the event the parachutist jumps/lands in a body of water, the electronic assembly 100 automatically causes a ram 103 to be fired into the catch 22 causing it to rotate counterclockwise with respect to the figures. This automatically causes a portion of the buckling system 10 to rotate to an open position and release the buckling member 73 from the buckle 8. The automatic release mechanism is disclosed in U.S. Pat. No. 5,029,368, which is hereby incorporated herein by reference.

Figure 5:
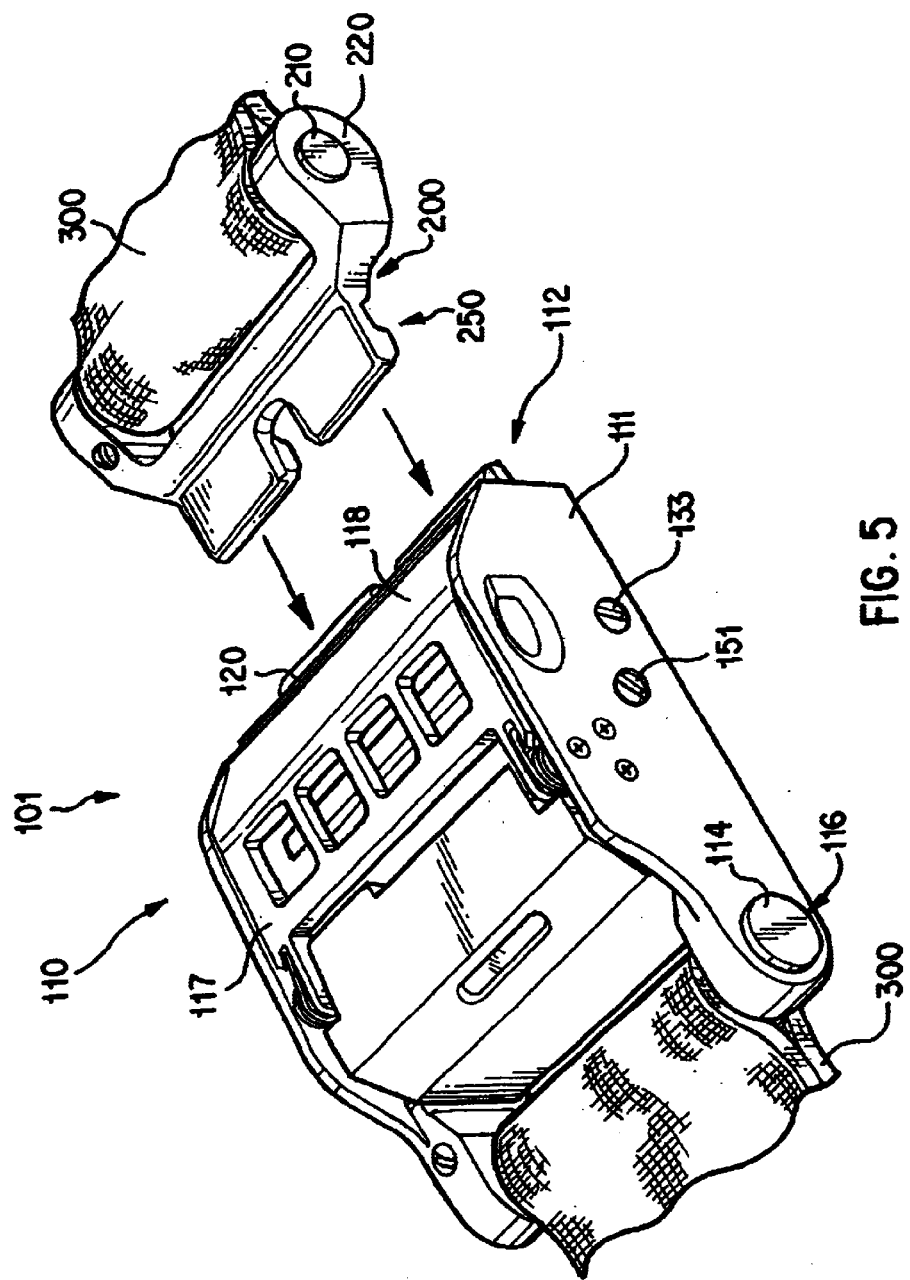
FIG. 5 is an isometric view of a buckle and cooperating buckling member according to another embodiment of the present invention.

Another embodiment of a buckle system 101 including a buckle 110 according to the present invention is illustrated in FIGS. 5–11. The buckle 110 can be opened manually or automatically, as discussed below. The buckle 110 includes housing frame 111 that has a first end 112 and a second end 116 secured to a portion of a known, man-mounted flight harness 300 as shown in FIG. 5. As with the above discussed buckle 8, the buckle 110 can be secured to the webbing of the harness 300 in any known manner, for example, by wrapping and securing a portion of the harness 300 around a post 114 that is securely retained at the second end 116 of the frame 111. The first end 112 securely receives a cooperating buckling member 200 secured to the harness 300. The cooperating buckling member 200 can be secured to the harness 300 in any known manner including wrapping and securing a portion of the harness 300 about a post 210 secured to a frame 220 of the buckling member 200. When the cooperating buckling member 200 is securely received within the frame 111, as discussed below, the harness 300 will be locked relative to the wearer.

Figure 7:
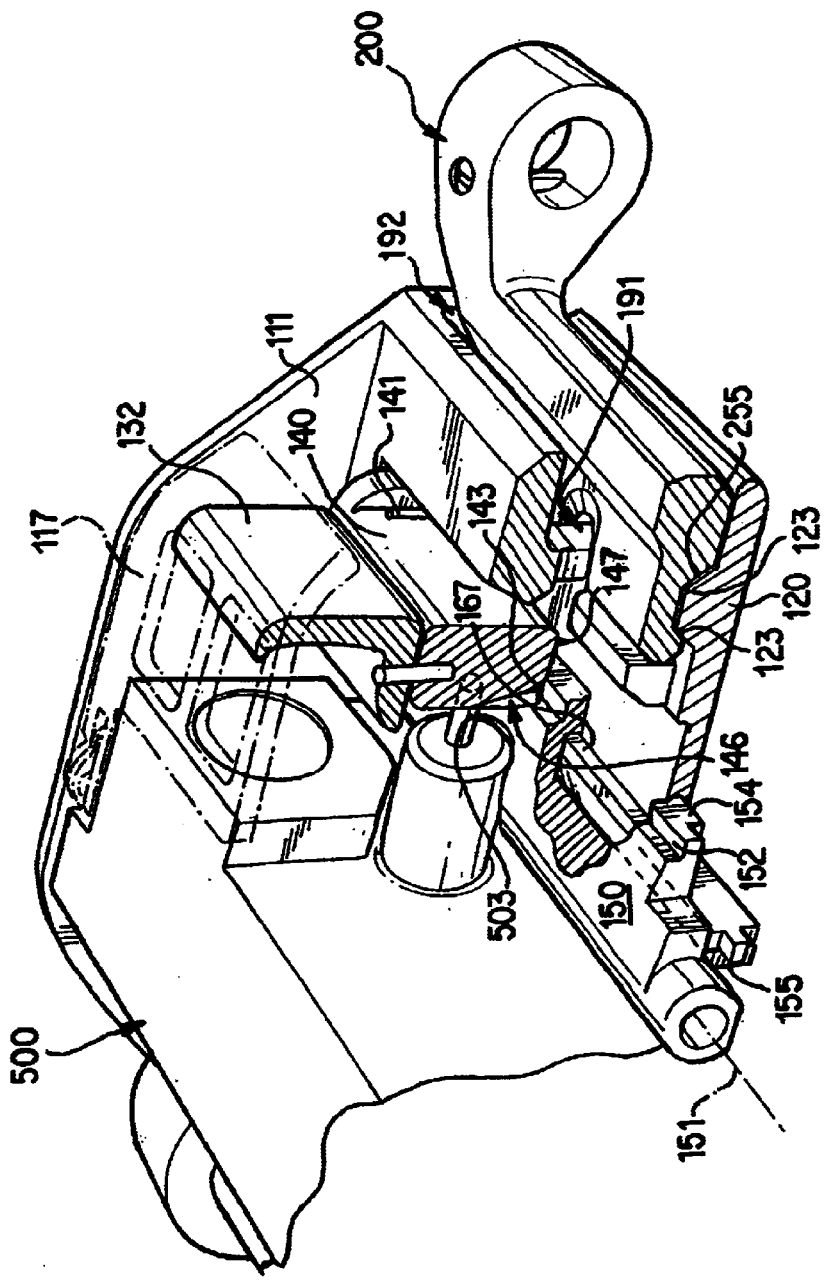
FIG. 7 is an isometric view partly in cross-section of the buckle of FIG. 5 in a closed/locked position.
Figure 8:
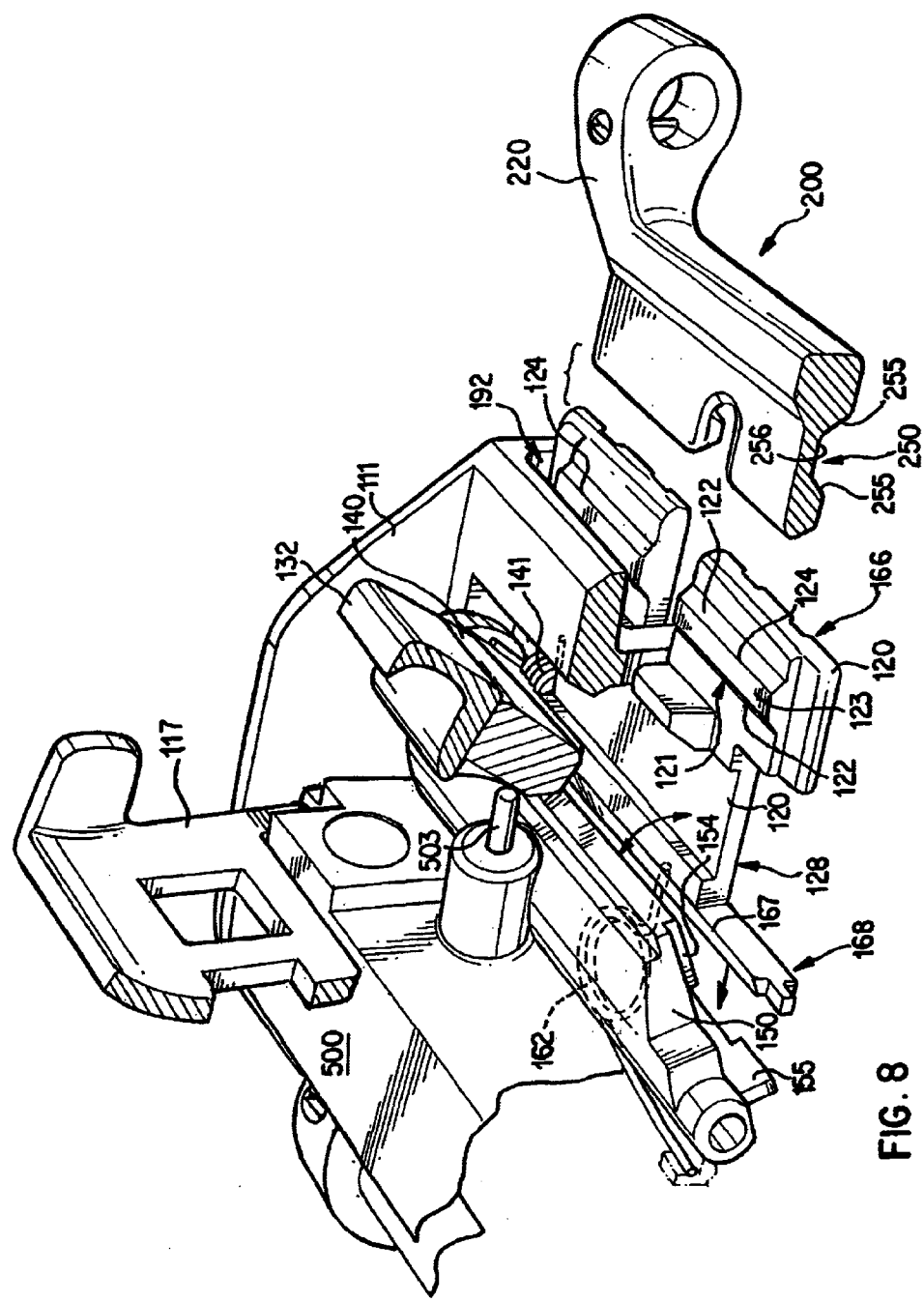
FIG. 8 is an isometric view partly in cross-section of the buckle of FIG. 5 in an open/unlocked position.
Figure 9:
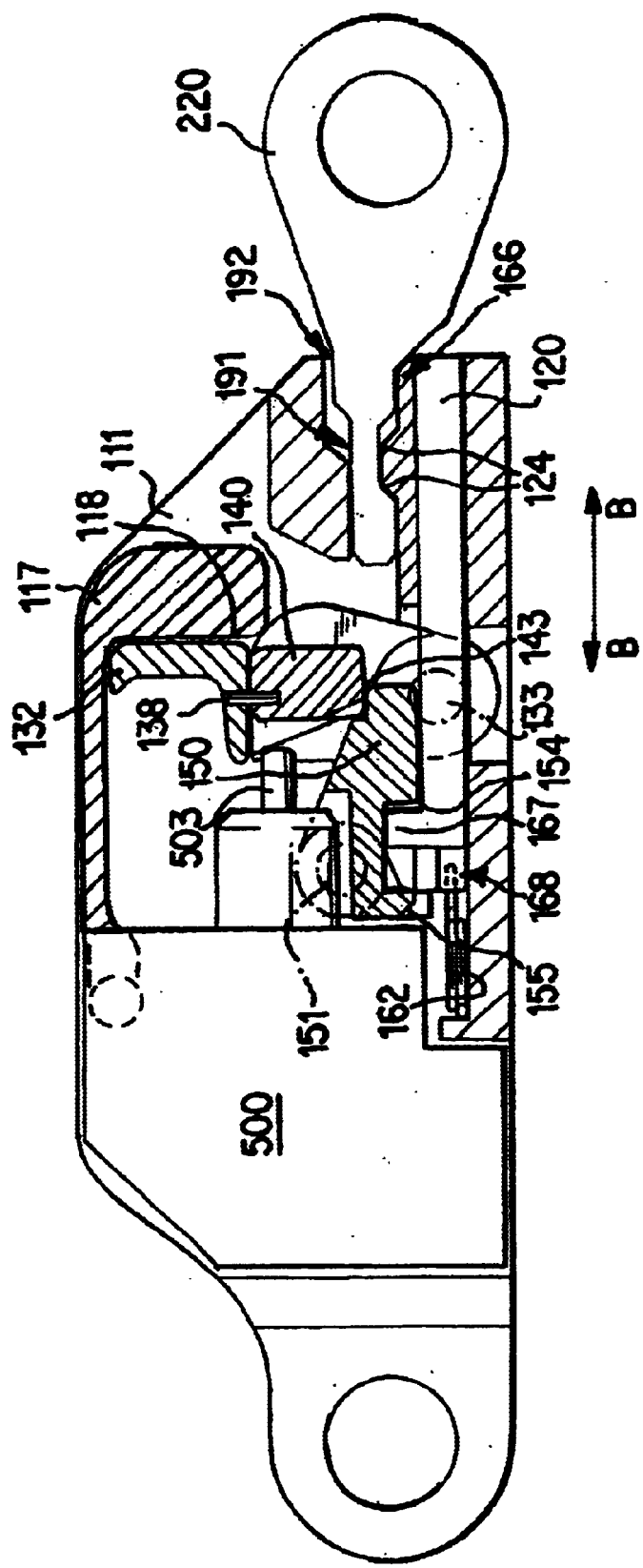
FIG. 9 is a side view partly in cross-section of the buckle of FIG. 5 in a closed/locked position.

The frame 111 comprises a narrow portion 191 and defines a "necked down" opening 192 (FIGS. 7–9). The narrow portion 191 extends into the necked down opening 192, as shown in FIGS. 7–9. The narrow portion 191 of the frame 111 provides an obstruction to hold the cooperating buckling member 200 engaged with a moveable slide 120 when the slide 120 is positioned substantially completely within the frame 111 and the buckle 110 is in the locked position (FIGS. 7 and 9).

Figure 6:
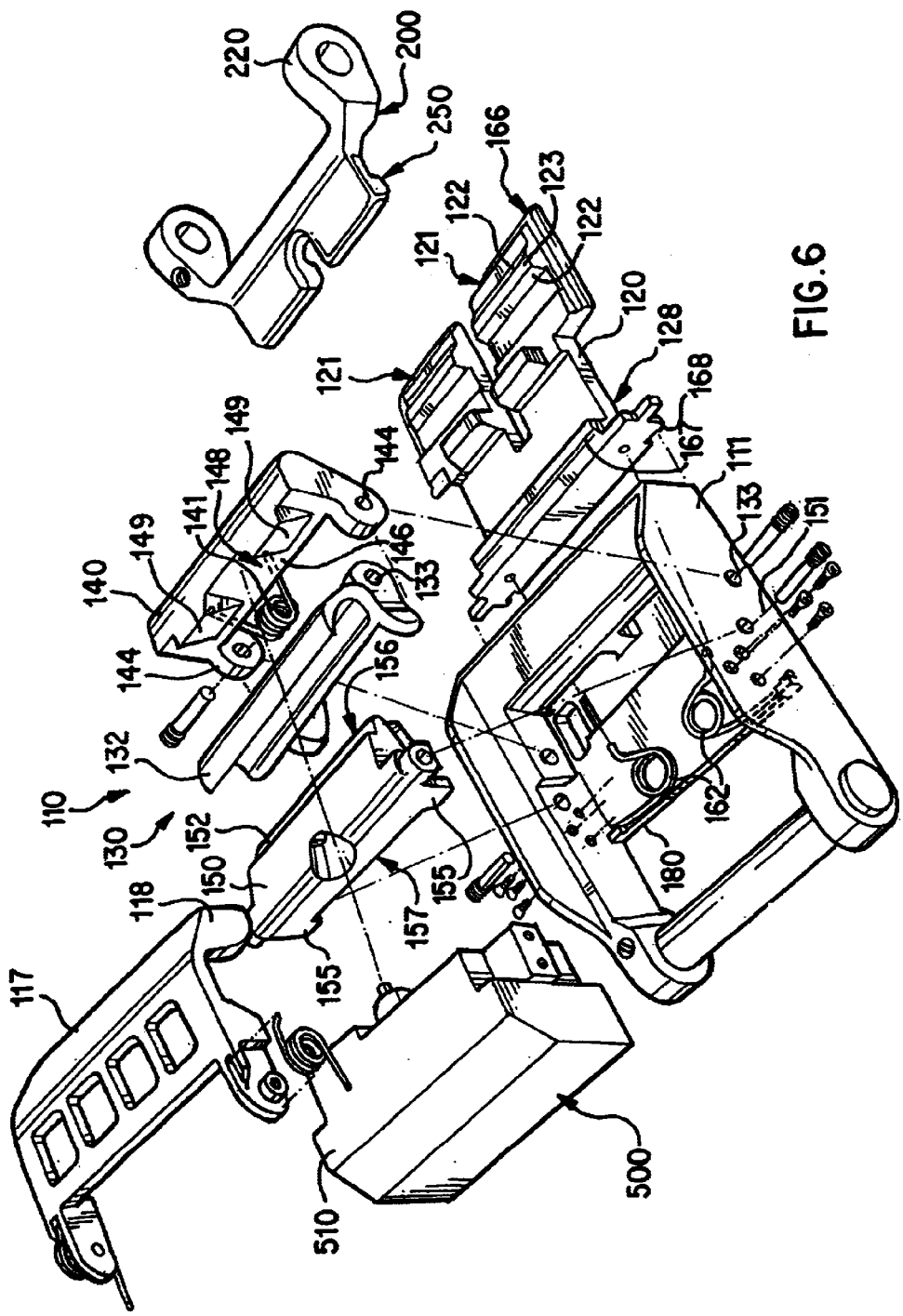
FIG. 6 is an exploded view of the buckle and cooperating buckling member shown in FIG. 5.

As shown in FIG. 9, the buckle 110 includes the moveable slide 120 that reciprocates within the frame 111 in the direction of arrows B. The slide 120 comprises a first end 166 and a second end 168 opposite the first end 166. The first end 166 includes a toothed portion 121 that cooperates with a toothed mating portion 250 of the buckling member 200 to hold the buckling member 200 within the frame 111 when the buckle 110 is in its locked position (FIGS. 7 and 9). The slide 120 further comprises a slide wall 128, and a slide contacting shoulder 167 near the second end 168 of the slide 120 as shown in FIG. 6. The slide contacting shoulder 167 is shaped to engage with a latch 150 as discussed below when the buckling member 200 is inserted into the buckle 110.

As illustrated in FIGS. 5–11, the mating portion 250 of the buckling member 200 has a profile that complements the profile of toothed portion 121 of the slide 120. For example, in one embodiment, the toothed mating portion 250 of the cooperating buckling member 200 may comprise a plurality of converging, angled surfaces 255 that extend at an angle of about 45° relative to a planar portion 256 that intersects the angled surfaces 255 at respective shoulders. Similarly, the toothed portion of the slide 120 includes converging, angled surfaces 122, which may also comprise an angle of about a 45° relative to a planar surface 123 that intersects these angled surfaces 122 at respective shoulders. When the cooperating buckling member 200 is positioned within the frame 111, the angled surfaces 255 contact the angled surfaces 122 of the slide 120 and their associated shoulders 124 while the slide 120 is in its locked position within the frame 111. The angled surfaces 122, 255 can extend at other angles relative to their respective planar surfaces. As with buckle 8, these angles can be between about 25° and 75°. In particular embodiments, the angles can be either 30° or 60°.

In operation, the angle cooperating angled surfaces 122, 255 cause the cooperating buckling member 200 to wedge between the slide 120 and the frame 111. This wedging creates a friction and interference fit that is greater than the pulling force exerted on the buckle 110 during its use. This friction and interference force in turn causes the cooperating buckling member 200 to lock into the buckle 110.

The buckle 110 includes a buckling system that comprises a manual release mechanism 130 and/or an automatic release mechanism 500. The manual release mechanism 130 includes a manual release lever 132. The manual release lever 132 is capable of moving toward the first end 112 of the buckle 110 during the release phase and toward the opposite end 116 of the buckle 110 during the locking phase. The movement of the manual release lever 132 is substantially arcuate rotation about its pivot axis 133.

As illustrated in FIG. 5, the buckle 110 also includes a cover 117 that is secured to the frame 111 so that the cover 117 will rotate relative to the frame 111. As shown in FIG. 8, the cover 117 can rotate upwardly in a counter-clockwise direction and downwardly in a clockwise direction with respect to the side of the frame 111 shown in the figures. However, it is understood, that the cover 117 rotates upwardly in a clockwise direction when viewed from the side of the frame 111 opposite that illustrated in the figures. The cover 117 includes a forward lip 118 that is proximate the first end 112 of the frame 111 when the cover is in the closed position shown in FIG. 9. The forward lip 118 operates as a block to prevent the premature and inadvertent manual release of the buckle 110 by contacting the manual release lever 132 and preventing the rotation of the manual release lever 132 in the direction of the first end 112 of the frame 111. As shown in FIG. 9, when in the closed position, the lip 118 contacts the release lever 132 and prevents it from moving within the frame 111 and causing the buckle to prematurely release. The lip 118 does not prevent the automatic release of the buckle 110 caused by the activation of the automatic release activation system 500.

As shown in FIG. 7, the buckle 110 also includes a catch 140 that can be secured to the manual release lever 132 by a frangible connector. A spring 141 biases the catch 140 into its locked position as illustrated in FIG. 7. In one embodiment, the frangible connector includes a shear pin 138 that extends between the manual release lever 132 and the catch 140. The shear pin 138 extends through an opening in both manual release lever 132 and the catch 140. The shear pin 138 contributes to coincidental movement of the manual release lever 132 and the catch 140 when the manual release lever 132 is operated. However, the shear pin 138 can fail and thereby permit the catch 140 to move freely relative to the manual release lever 132 and the frame 111 when the lip 118 prevents the rotation of the manual release lever 132 as discussed below. In this instance, the manual release lever 132 does not rotate with the catch 140 as the buckle releases the buckling member 200. Other known frangible connectors can be used in place of the shear pin 138.

The catch 140 includes a pair of opposing pivot side ends 144 as shown in FIG. 6. Each of these pivot ends 144 rotates about an axis 145 as the catch 140 rotates from its locked position to its open position; The catch 140 includes a recess 146 proximate its lower surface 147. The recess 146 receives a portion of a latch 150 when the catch 140 is in its locked position as shown in FIG. 9. The catch 140 also includes a back surface 148 that extends between a pair of teeth 149 positioned on opposite sides of the catch 140. The back surface 148 can receive a ram plunger 503 from an automatic release mechanism 500 as discussed below and shown in FIGS. 10 and 11.

The latch 150 is rotatable about its axis 151. The latch 150 includes a grooved portion 152 at a first, free end 156 that extends in the direction of the first end 112 of the buckle 110 as illustrated in FIG. 6. The grooved portion 152 is received in the recess 146 of the catch 140, as discussed above. The latch 150 also includes a tooth 154 that is capable of rotating into and out of engagement with a portion of the slide 120 to prevent the slide 120 from moving relative to the frame 111. The tooth 154 is located at a pivoting end 157 of the latch 150 that is opposite the grooved portion 152 as shown in FIG. 6. The pivoting end 157 rotates about the pivot axis 151.

Figure 10:
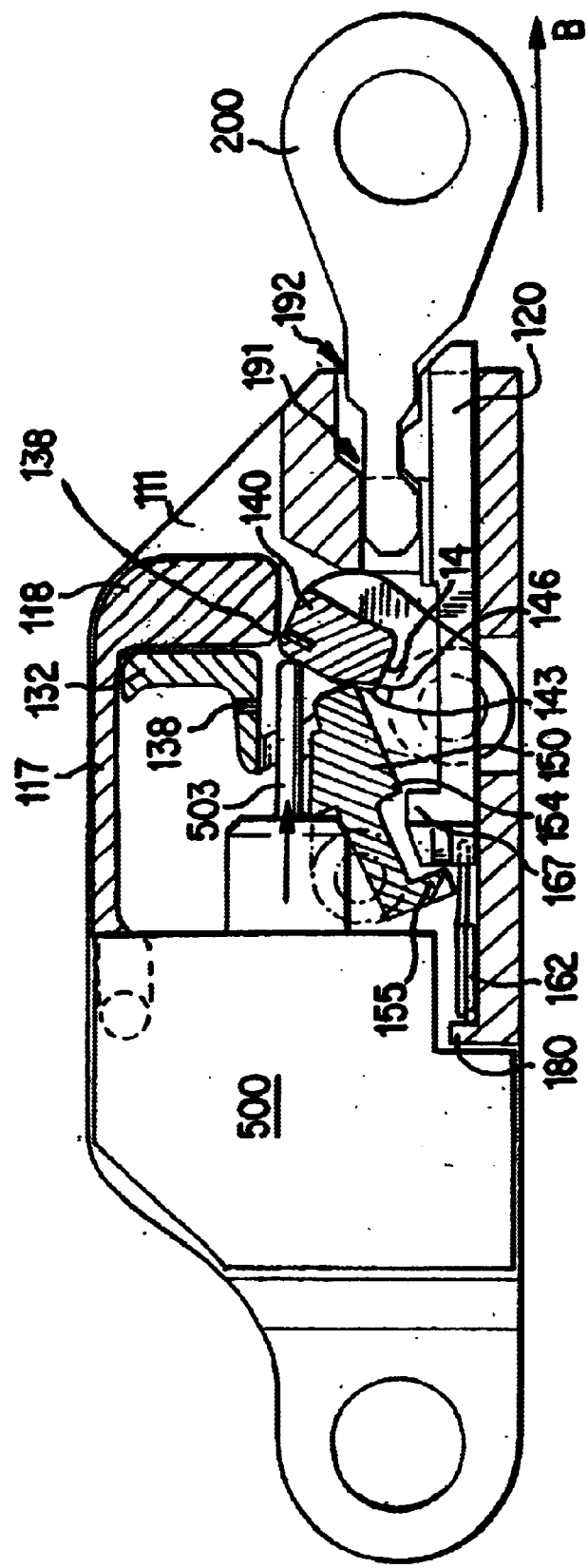
FIG. 10 is a side view partly in cross-section of the buckle of FIG. 5 showing an automatic buckle release mechanism in operation and the buckle moving into the open position.
Figure 11:
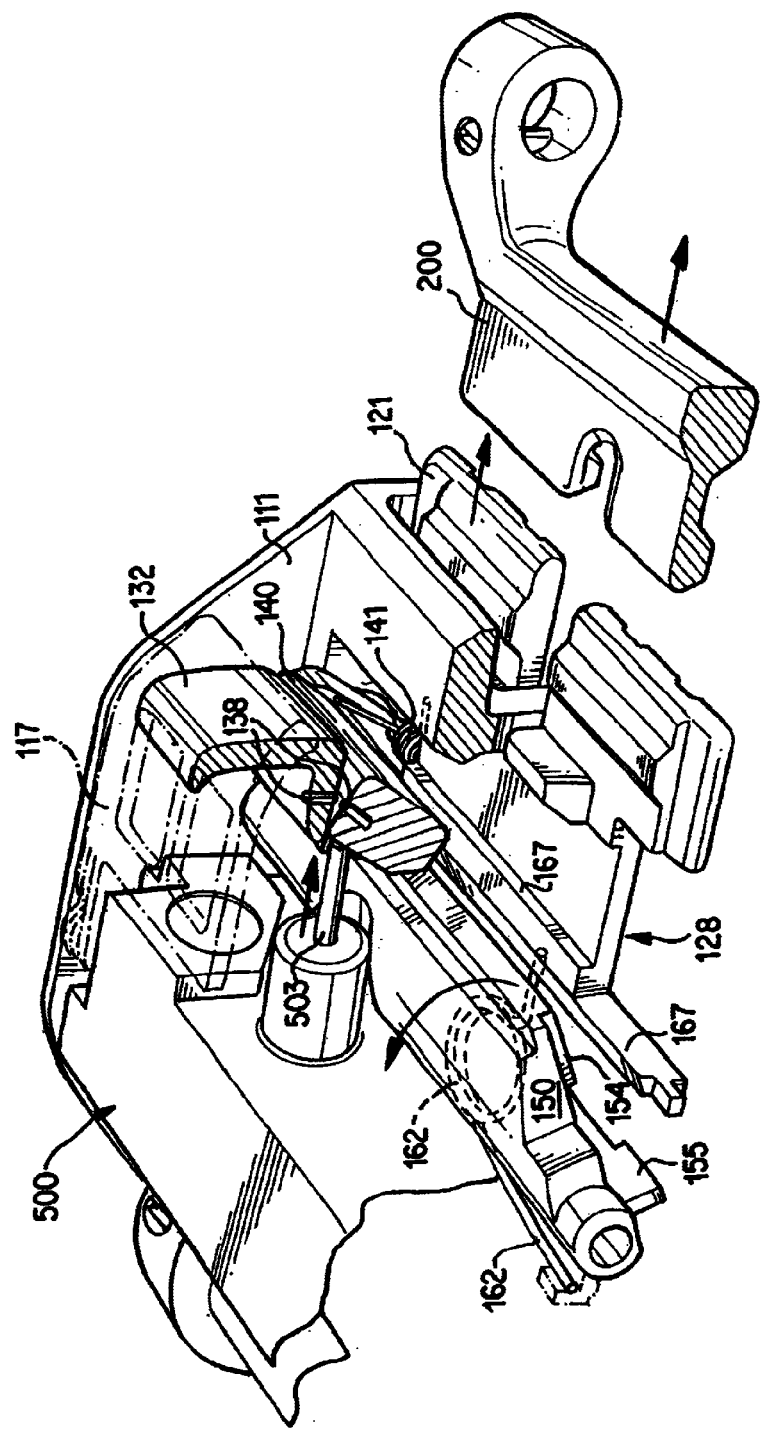
FIG. 11 is an isometric view partly in cross-section of the buckle of FIG. 5 showing the automatic buckle release mechanism in operation and the buckle in an open position.

The slide 120 can be reciprocally moved within the frame 111 in the directions of the arrow B shown in FIG. 10. The slide 120 reciprocates between the locked position (FIG. 7) and the open position (FIG. 8). Slide springs 162, shown in FIG. 6, bias the slide 120 in the direction of the first end 112 of the frame 111. The slide springs 162 are positioned between a support member 180, which is spaced from the first end 112 of the frame 111 and the second end 168 of the slide 120. As a result, when the latch 150 rotates during the releasing phase of the buckle 110 and is released from the catch 140, the slide springs 162 force the slide 120 in the direction of the first end 112 of the frame 111. The slide springs 162 have a spring constant that provides sufficient force to drive the slide 120 within the frame 111 and the toothed portion 121 of the slide 120 out of the opening 192 of the frame 111, thereby exposing the cooperating buckling member 200. During the locking phase of the buckle 110, the cooperating buckling member 200 is inserted in the frame 111 and the slide 120 is forced against the bias of the slide springs 162 in the direction of the second end 116 of the frame 111.

Operation of the Buckle Release Mechanism

The buckle 110 operates in a similar manner to the buckle 8. When the buckle 110 is in its locked (closed) position (FIG. 7), the catch 140 is spring biased toward the second end 116 of the frame 111. Also, the buckling member 200 is held in the buckle frame 111 by the slide 120 and the frame 111 as discussed above. Specifically, the toothed portion 121 of the slide 120 and the narrow portion 191 of the frame 111 create a wedge-like interference fit with the buckling member 200. The toothed portion 121 of the slide 120 and the narrow portion of the frame 111 contact the buckling member 200 as it moves within the frame 111 and prevents the buckling member 200 from inadvertently and unintentionally exiting the frame 111. As shown in FIG. 9, the manual release lever 132 is prevented from rotating or otherwise moving in the direction of the first end 112 of the frame 111 by the lips 118 of the cover 117. When the cover 117 is in its closed position as shown in FIG. 7, the buckle 110 cannot be manually released.

Rotating cover 117 in a counter-clockwise direction with respect to FIG. 8 causes the manual release lever 132 to be exposed. Then, the manual release member 132 can be rotated in the clockwise direction with respect to FIG. 8 and in the direction of the first end 112 of the frame 111. As the manual release lever 132 rotates, the shear pin 138 causes the catch 140 to rotate in the same direction as the manual release lever 132. As a result, the first end of the latch 150 moves out of the latch recess 146 defined in the catch 140 and away from a latch holding ledge 143. The latch 150 then rotates freely in the counter-clockwise direction under the force provided by the slide springs 162 acting on the slide 120 and moving the slide 120 toward the first end of the frame 111.

Additionally, during the rotation of the latch 150, the tooth 154 on the latch 150 moves along the slide wall 128 on the slide 120. Once the tooth 154 clears the slide wall 128, the slide 150 is freed, and moves toward the first end 112 of the frame 111 under the force of the slide springs 162. The tooth 154 then slides over the tooth contacting shoulder 167 of the slide 120 as the slide 120 continues moving toward the first end 112 of the frame 111. Also, the projection 155 on the latch 150 rotates counter-clockwise with respect to FIG. 9 about the latch pivot 151. The projection 155 can engage with and contact the second end 168 of the slide 120, and to a lesser degree assists slide springs 162 in moving the slide 120 toward and through the opening 192. In an embodiment, the latch 150 can continue to rotate until the free end 156 of the latch 150 contacts a latch stop ledge 143 of the catch 140, as shown in FIG. 7.

As the manual release lever 132 is rotated in the direction of the first end 112 of the frame 111, the opening 192 of the frame 111 allows the cooperating buckling member 200 to move within and out of the frame 111 as the slide 120 moves toward and through the opening 192. As the buckling member 200 is exposed outside the opening 192, and thus the frame 111, the buckling member 200 can be separated from the buckle 110 and the harness 300 removed from the wearer.

Conversely, as discussed above, when the buckle 110 is in the locked position, the cooperating buckling member 200 is held in place by the frame 111 and the contacting shoulder 122 of the slide 120, which is locked in place. The slide contacting shoulder 122 and the cooperating buckling member 200 cannot slide over one another, because they are both located in the narrow portion 191 of the frame 111. This causes the illustrated interference wedge that holds the cooperating buckling member 200 within the frame 111. However, to achieve the locked position, the buckling member 200 must be inserted into the buckle 110.

Insertion of the buckling member 200 and locking of the buckle 110 is accomplished by forcing the buckling member 200 into the buckle 110 against the force of the slide springs 162. The engagement between the buckling member 200 and the slide 120 and their insertion into the frame 111 causes the slide 120 to move toward the second end 116 of the frame 111. This movement of the slider 150 causes the latch 150 to rotate in the direction of the first end 112 about latch pivot 159. As this occurs, the slide springs 162 continue to compress. The clockwise rotation of the latch 150 causes the catch 140 to rotate toward the first end 112. The catch 140 continues to rotate toward the first end 112 and against the force of its spring until the free end 156 of the latch 150 moves into the latch recess 146 in the catch 140, and the free end 156 of the latch 150 engages the latch stop ledge 143.

Therefore, as discussed above with respect to the buckle 8, the introduction of the buckling member 200 into the frame 111 and movement of the buckling member 200 toward the second end 116 of the frame 111 causes the latch 150 to rotate into its starting position as shown in FIG. 9, wherein its free end 156 engages with the latch recess 146 defined in the catch 140. The projection 155 rotates to it starting position, contacts the second end 168 of the slide 120, and prevents the slide 120 from moving toward the first end 112. Once the buckle 110 is in the locked position as shown in FIG. 9, the cover 117 is closed and placed into engagement with the manual release lever 132 to prevent inadvertent movement of the manual release lever 132. The cover 117 is held in its closed position (FIG. 5) by springs 187.

As discussed previously with respect to FIG. 4, the buckle according to the present invention can includes an automatic buckle release mechanism 500 (FIG. 10). This automatic buckle release mechanism 500 can include an electronic assembly 510 that provides for automatically releasing the buckling member 200 from the buckle 110. If certain conditions are met, such as the sensing of water in the event the parachutist jumps/lands in a body of water, the electronic assembly 500 automatically causes the ram 503 to be fired into the catch 140, thereby causing the catch 140 to rotate toward the first end 112 of the frame 111. Since the manual release lever 132 is prevented from moving relative to the frame 111 by the cover 117, the shear pin 138 fails in response to the contacting of the catch 140 by the ram 530. As a result, the catch 140 rotates relative to the manual release lever 132 and the frame 111. This causes the slide 120 to move in the direction of the opening 192 and the automatic release of the buckling member 200 from the buckle 110. One such automatic release mechanism 500 usable in the buckle according to the present invention is disclosed in U.S. Pat. No. 5,029,368 that is incorporated herein by reference.

While the buckle has been described herein with respect to certain embodiments, these descriptions are not intended to limit the scope of the buckle to the particular forms set forth, but, on the contrary, they are intended to cover such alternatives, modifications, and equivalents as may be included within the spirit and scope of the buckle release mechanism as defined by the appended claims. Additionally, the above-discussed directions are exemplary and used to explain the operation of the buckle embodiments with respect to the figures illustrating the buckle. These directions do not limit the operation of the buckle.

What is claimed is:

1. A buckle comprising:

a) a frame comprising a first end and a second end, said first end including an area for receiving a cooperating buckling member;

b) a manual release lever mounted to the frame such that said manual release member is moveable relative to said frame;

c) a catch moveably mounted to said frame, said catch being moveable in response to movement of the manual release lever relative to said frame, said catch being spaced from said manual release lever, and said catch defining a latch recess and comprising a latch holding ledge;

d) a latch comprising a first end for being received within said latch recess of said catch, said first end of said latch being held within said latch recess by said latch holding ledge when said buckle is in a locked position, a pivot end mounted on a latch pivot for rotational movement relative to said frame, and a tooth;

e) a slide received in the frame, the slide comprising a first end, a second end, and a slide wall for engaging the tooth of said latch, and wherein when said buckle is in a locked position the tooth of the latch engages the slide wall and prevents movement of the slide, and when said buckle moves toward an open position the latch is rotated and the tooth moves out of the way of the slide wall allowing movement of the slide; and f) at least one member for biasing the slide toward said first end of said frame when the tooth of the latch is moved out of the way of the slide wall.

2. The buckle according to claim 1 wherein the slide further comprises: a slide contacting shoulder and a tooth contacting shoulder, and the buckle further comprises a buckle lip.

3. The buckle according to claim 2 wherein in the locked position the slide contacting shoulder and the buckle lip contact one another, and in the open position the buckle lip slides over the slide contacting shoulder of the slide and moves out the frame through an opening defined in the frame at said first end of said frame.

4. The buckle according to claim 3 wherein the slide contacting shoulder and the buckle lip are each at about a 45 degree angle, and wherein in the locked position the slide contacting shoulder and the buckle lip contact one another and form a wedge.

5. The buckle according to claim 1 wherein said at least one member for biasing the slide includes a slide spring including a torsion spring.

6. The buckle according to claim 1 wherein the catch is spring biased in a direction opposite the first end of said frame.

7. The buckle according to claim 1 wherein the catch further comprises a latch stop portion for contacting with and stopping the rotation of the latch when the manual release lever is pulled and the movement of the slide causes rotation of the latch.

8. The buckle according to claim 1 further comprising a lock member mounted to the frame for preventing inadvertent movement of the manual release lever relative to said frame.

9. The buckle according to claim 1 wherein said catch is secured to said manual release lever by a frangible connector such that said catch can move independent of said manual release lever when said frangible connector has failed.

10. A buckle for receiving a cooperating buckling member, said buckle comprising:

a) a frame comprising an area for receiving the buckling member;

b) a release lever rotatably mounted to the frame;

c) a catch pivotally secured relative to said frame such that said catch is rotatable relative to said frame, wherein said catch is secured relative to said release lever such that said catch rotates when said release lever rotates relative to said frame and said release lever can be free of rotation when said catch rotates relative to said frame, said catch defining a latch recess and comprising a latch holding ledge;

d) a latch comprising a first end, said latch being pivotable relative to said frame, wherein when said buckle is in a locked position the first end of the latch is received in the latch recess defined in the catch and held therein by the latch holding ledge; and e) a slide positioned within said frame, the slide comprising a first end, a second end, and a slide wall for engaging a portion of said latch, and wherein in the locked position said portion of said latch engages the slide wall and prevents movement of the slide within said frame.

11. The buckle according to claim 10 further comprising a slide spring for biasing said slide toward the receiving area of said frame, and wherein in the open position the tooth disengages the slide wall and said slide spring forces at least a portion of the slide out of the frame.

12. The buckle according to claim 10 wherein the slide further comprises: a slide contacting shoulder and a tooth contacting shoulder, and the buckling member further comprises a buckle lip for engaging a portion of said slide.

13. The buckle according to claim 12 wherein in the locked position the slide contacting shoulder and the buckle lip contact one another, and in the open position the buckle lip slides over the slide contacting shoulder of the slide and moves out the frame through and opening defined in the frame.

14. The buckle according to claim 13 wherein in the locked position, the slide contacting shoulder and the buckle lip contact one another and form a retaining wedge.

15. A method for providing a buckle including a buckle release system comprising the steps of:

a) providing a frame;

b) providing a pivot pivotally mounted to the frame, and providing a manual release lever engageable with the pivot;

c) providing a catch mounted on the pivot, the catch spring biased in a locked position and defining a latch recess, and comprising a latch holding ledge;

d) providing a latch comprising a free end, a pivot end, a tooth, and a projection, the pivot end of the latch attached to a latch pivot, the latch pivot pivotally mounted to the frame, and wherein in the locked position the free end of the latch is received in the latch recess defined in the catch and held therein by the latch holding ledge;

e) providing a slide received in the frame, the slide comprising a first end, a second end, and a slide wall for engaging the tooth, and wherein in the locked position, the tooth of the latch engages the slide wall and prevents movement of the slide, and wherein in the open position, the tooth moves out of the way of the slide wall;

f) positioning a slide spring against the second end of the slide, the spring for moving the slide out of the frame when the catch rotates;

g) providing a buckle and capturing the buckle between the frame and the slide in the locked position.

16. The method according to claim 15 further comprising the steps of pulling a manual release lever causing the catch to rotate and allowing the slide to move out of the frame and release the buckle.

17. The method according to claim 15 further comprising the step of using a friction force between the slide and buckle to lock the buckle in the buckle release system.

18. The method according to claim 15 further comprising the steps of providing the slide with a slide contacting shoulder and a tooth contacting shoulder, and providing the buckle with a buckle lip.

19. The method according to claim 18 wherein in the locked position the slide contacting shoulder and the buckle lip contact one another, and in the open position the buckle lip slides over the slide contacting shoulder of the slide and moves out of the frame through an opening defined in the frame.

20. The method according to claim 19 further comprising the step of forming the slide contacting shoulder and the buckle lip with a face that forms about a 45 degree angle with an adjacent surface.

* * * * *